US012269235B2

(12) United States Patent
Patz et al.

(10) Patent No.: US 12,269,235 B2
(45) Date of Patent: Apr. 8, 2025

(54) DESTACKING SYSTEM FOR CARDBOARD BLANKS

(71) Applicant: MULTIVAC SEPP HAGGENMUELLER SE & CO. KG, Wolfertschwenden (DE)

(72) Inventors: Dominik Patz, Kempten (DE); Robert Maier, Babenhausen (DE); Bernd Hoepner, Kempten (DE); Philipp Adermann, Kempten (DE)

(73) Assignee: MULTIVAC Sepp Haggenmueller Se & Co. KG, Wolfertschwenden (DE)

( * ) Notice: Subject to any disclaimer, the term of this patent is extended or adjusted under 35 U.S.C. 154(b) by 128 days.

(21) Appl. No.: 18/104,387

(22) Filed: Feb. 1, 2023

(65) Prior Publication Data

US 2023/0241855 A1 Aug. 3, 2023

(30) Foreign Application Priority Data

Feb. 1, 2022 (DE) ......................... 102022102310.9

(51) Int. Cl.
*B31B 50/00* (2017.01)
*B31B 50/06* (2017.01)
(Continued)

(52) U.S. Cl.
CPC ............ *B31B 50/06* (2017.08); *B31B 50/005* (2017.08); *B31B 50/07* (2017.08); *B31B 50/592* (2018.05)

(58) Field of Classification Search
CPC ....... B31B 50/06; B31B 50/07; B31B 60/062; B31B 43/14; B65G 59/06; B65H 3/44;
(Continued)

(56) References Cited

U.S. PATENT DOCUMENTS 3,533,207 A * 10/1970 Jones ........................ B65B 5/06 53/575
11,027,478 B2 6/2021 Haggenmueller et al.
(Continued)

FOREIGN PATENT DOCUMENTS

DE 101 54 235 A1 5/2003
DE 10 2012 001 817 A1 8/2013
(Continued)

OTHER PUBLICATIONS

German Search Report Dated Jan. 3, 2023, Application No. 10 2022 102 310.9, Applicant MULTIVAC Sepp Haggenmueller SE & Co. KG, 8 Pages.

(Continued)

*Primary Examiner* — Jacob A Smith
(74) *Attorney, Agent, or Firm* — Brooks Kushman P.C.

(57) ABSTRACT

A destacking system for cardboard blanks comprises a deposition unit for cardboard blanks with first and second deposition positions, a first destacker comprising a first stacking magazine for accommodating a first stack of cardboard blanks, a first retaining system for retaining the cardboard blanks at a first stacking position, and a first conveying unit with a first gripper to grip a first cardboard blank of the first destacker at the first stacking position and convey the first cardboard blank to the first deposition position, a second destacker comprising a second stacking magazine for accommodating a second stack of cardboard blanks, a second retaining system for retaining the cardboard blanks at a second stacking position, and a second conveying unit with a second gripper configured to grip a second cardboard blank of the second destacker at the second stacking position and convey the second cardboard blank to the second deposition position.

20 Claims, 4 Drawing Sheets

(51) Int. Cl.
*B31B 50/07* (2017.01)
*B31B 50/59* (2017.01)

(58) Field of Classification Search
CPC .......... B65H 3/08; B65H 1/28; B65B 43/185; B65B 5/024; B65B 43/265
USPC .......... 493/123, 313, 122, 309; 53/564, 566, 53/168, 458, 540, 207, 252
See application file for complete search history.

(56) References Cited

U.S. PATENT DOCUMENTS

| | | | | |
|---|---|---|---|---|
| 2002/0184858 | A1* | 12/2002 | Ausnit | B65B 9/04 53/450 |
| 2006/0252626 | A1* | 11/2006 | Delisle | B29C 66/43 493/394 |
| 2012/0324833 | A1* | 12/2012 | Koch | B65B 21/24 53/558 |

FOREIGN PATENT DOCUMENTS

| | | | | |
|---|---|---|---|---|
| DE | 10 2013 101 820 | A1 | 8/2014 | |
| DE | 10 2017 121 438 | A1 | 3/2019 | |
| FR | 2 418 184 | A1 | 9/1979 | |
| FR | 2450767 | A1 * | 10/1980 | B65G 59/10 |
| FR | 3 034 404 | A1 | 10/2016 | |

OTHER PUBLICATIONS

European Search Report (with English Machine Translation) Dated Jun. 27, 2023, Application No. 23150725.2-1014, Applicant MULTIVAC Sepp Haggenmüller SE & Co. KG, 14 Pages.

* cited by examiner

DESTACKING SYSTEM FOR CARDBOARD BLANKS

CROSS-REFERENCE TO RELATED APPLICATIONS

This application claims foreign priority benefits under 35 U.S.C. § 119(a)-(d) to German patent application number DE 10 2022 102 310.9, filed Feb. 1, 2022, which is incorporated by reference in its entirety.

TECHNICAL FIELD

The present disclosure relates to a destacking system for cardboard blanks, and a method for destacking cardboard blanks. The present disclosure further relates to a thermoform packaging machine or a tray sealer including a destacking system for cardboard blanks.

BACKGROUND

DE 10 2017 121 438 A1 discloses a thermoform packaging machine including a forming station having a forming tool lower part. The forming tool lower part comprises at least one reception unit having one or a plurality of troughs for cardboard elements, a film web being formed into the cardboard elements during the forming process, so that also foodstuffs can be packed in a gastight manner and such that a long shelf life will be accomplished. DE 10 2012 001 817 A1 discloses a packaging machine with a sealing station for closing trays with a cover film.

For producing composite packages including a cardboard tray, flat cardboard blanks are first separated by a stacking device and formed into a tray shape. The cardboard blanks formed into a tray shape are usually placed individually into a transfer unit or directly into receiving molds of a work station of the packaging machines. There is a need to render these process steps more efficient.

SUMMARY

It is an object of the present disclosure to provide an efficient system for destacking cardboard blanks and an efficient method for destacking cardboard blanks.

An aspect of the present disclosure relates to a destacking system for cardboard blanks, comprising at least one deposition unit for cardboard blanks with at least a first deposition position and a second deposition position. The destacking system comprises at least a first destacker comprising a first stacking magazine for accommodating a first stack of cardboard blanks, a first retaining system for retaining the cardboard blanks at a first stacking position, and a first conveying unit with a first gripper configured to grip at least one first cardboard blank of the first destacker at the first stacking position and convey the first cardboard blank to the first deposition position. The destacking system includes a second destacker comprising a second stacking magazine for accommodating a second stack of cardboard blanks, a second retaining system for retaining the cardboard blanks at a second stacking position, and a second conveying unit with a second gripper configured to grip at least one second cardboard blank of the second destacker at the second stacking position and convey the second cardboard blank to the second deposition position.

This destacking system allows separating a group of cardboard blanks from a plurality of cardboard blank stacks in a single work station, preferably also shaping the cardboard blanks (e.g., raising the blanks, at least section-wise, e.g., transforming them from a flat into a three-dimensional shape) and providing them in a predetermined grouping format, e.g., in a predetermined distance pattern. The cardboard blanks deposited in the predetermined grouping format can be conveyed to a work station of a packaging machine by means of a manipulator unit. The conveying units of the destackers may be releasably coupled to the respective stacking magazines. The conveying units of the destackers may be arranged to the respective stacking magazines in a mechanically separated way. The destackers of the destacking system may be movably coupled to one another by means of fastening arms. The cardboard blanks may be conveyed into the deposition unit in an unfolded or a folded state or in a state in which they have been formed into a tray shape. The deposition unit may be arranged below the destackers. The destacking system may comprise more than two destackers, preferably three to five destackers. Each destacker may be equipped and configured in a manner identical to the first or the second destacker. The conveying of separated cardboard blanks from the juxtaposed destackers to the juxtaposed deposition positions of the deposition unit may take place simultaneously or with a time delay. The retaining system may have retaining plates that are formed perpendicularly with respect to lateral stacking magazine supports, so as to retain the cardboard blanks in the stacking magazine. The destacking system may also be suitable for structural elements other than the cardboard blanks. The structural element may be made of a renewable raw material, metal or plastic.

An angle may be provided between a first center axis of the first destacker and a second center axis of the second destacker, the angle having a value of 0° to 45°, particularly of more than 0°, preferably of 10° to 30°. The stacked cardboard blanks in juxtaposed destackers, which may possibly be arranged parallel to one another, may be spaced apart by a first distance, when seen from above. The destacked cardboard blanks of the juxtaposed destackers may, when seen from above, be spaced apart by a second distance in the deposition unit according to a grouping format of a packaging machine. Adjusting the inclination between the juxtaposed destackers can cause the second distance to be smaller than the first distance. An angle may be provided between a first central axis of the first transport unit and a second central axis of the second transport unit, the angle having a value from 0° to 45°, preferably more than 0°, preferably from 10° to 30°. Adjusting the inclination between the juxtaposed transport units of the respective conveying units can cause the second distance to be smaller than the first distance.

A minimum distance between a first receiving side of the first stacking magazine and a second receiving side of the second stacking magazine may be larger than a minimum distance between a first deposition area at the first deposition position and a second deposition area at the second deposition position.

The first conveying unit may be configured to move the first gripper in a rectilinear or in an arcuate path at least between the first stacking position and the first deposition position. The first gripper may have two gripping units. The gripping units may be arranged on a plate of the first conveying unit. The first conveying unit may be provided with a lifting unit for axially displacing the plate.

The second conveying unit may be configured to move the second gripper in a rectilinear or in an arcuate path at least between the second stacking position and the second deposition position. The second gripper may have two gripping units. The gripping units may be arranged on a plate of the second conveying unit. The second conveying unit may be provided with a lifting unit for axially displacing the plate.

The deposition unit may have a first passage opening at the first deposition position, the first conveying unit being configured to move at least a portion of the first gripper, preferably a portion of the first gripping unit of the first gripper, through the first passage opening. The deposition unit may have a second passage opening at the first deposition position, the first conveying unit being configured to move at least a portion of the first gripper, preferably a portion of the second gripping unit of the first gripper, through the second passage opening. The deposition unit may have a third passage opening at the second deposition position, the second conveying unit being configured to move at least a portion of the second gripper, preferably a portion of a first gripping unit of the second gripper, through the third passage opening. The deposition unit may have a fourth passage opening at the second deposition position, the second conveying unit being configured to move at least a portion of the second gripper, preferably a portion of the second gripping unit of the second gripper, through the second passage opening. This allows the cardboard blanks to be conveyed between a stacking position and a deposition position. The deposition unit may have a fourth passage opening at the second deposition position, the second conveying unit being configured to move at least a portion of the second gripper, preferably a portion of the second gripping unit of the second gripper, through the second passage opening.

The deposition unit may have, at the first deposition position, a first trough for receiving and shaping (e.g., raising) cardboard blanks, and, at the second deposition position, a second trough for receiving and shaping cardboard blanks. The deposition unit may also have a plurality of troughs corresponding to the number of destackers. Troughs may be movable along the deposition unit, so that a distance between the troughs can be adjusted. At least one suction unit, preferably two to four suction units, may be arranged below each of the troughs. The grouping format of the deposited cardboard blanks may correspond to a distance pattern between the troughs.

The first gripper may be configured to grip the first cardboard blank of the first destacker at the first stacking position by suction and pull it into the first trough, the second gripper being configured to grip the second cardboard blank of the second destacker at the second stacking position by suction and pull it into the second trough. The respective grippers may each include at least one suction unit that communicates with a vacuum pump.

The first destacker may have a first die including a first receiving mold for receiving and shaping (e.g., raising) cardboard blanks, the first die having a first opening, and the first conveying unit being configured to move a portion of the first gripper through the first opening. The cardboard blanks can initially be preformed by the first die and the preformed cardboard blanks can then be pulled into the first trough of the deposition unit, so as to obtain their final shape. This two-stage forming allows the sidewalls of the cardboard blanks to be oriented more easily and with a better result. The first die may have two to four passage openings.

The second destacker has a second die including a second receiving mold for receiving and shaping cardboard blanks, the second die having a first opening, and the second conveying unit being configured to move a portion of the second gripper through the first opening. The cardboard blanks can initially be preformed by the second die and the preformed cardboard blanks can then be pulled into the second trough of the deposition unit, so as to obtain their final shape. This two-stage forming allows the sidewalls of the cardboard blanks to be oriented more easily and with a better result. The second die may have two to four passage openings.

An aspect of the present disclosure further relates to a thermoform packaging machine comprising the destacking system for cardboard blanks according to one of the above-described variants. The thermoform packaging machine may be provided for producing packages with folded cardboard blanks lined with a film in the interior thereof, so that also foodstuffs can be packed in a gastight manner and such that a long shelf life will be accomplished. The destacking system of the thermoform packaging machine may, for example, be arranged upstream of or beside the forming station. The cardboard blanks formed or folded in the destacking system can be manually placed into a conveying system or feed belt of the thermoform packaging machine, and the conveying system feeds the formed cardboard blanks to the forming station, e.g., troughs, where they are placed manually or automatically into the forming tool lower parts that include receiving molds and troughs, respectively. The formed or folded cardboard blanks grouped in a predetermined format according to a distance pattern of the troughs can be fixed directly in a conveying system or feed belt of the thermoform packaging machine, and the conveying system feeds the grouped cardboard blanks to the forming station, where they are placed manually or automatically into the forming tool lower parts. The conveying system of the thermoform packaging machine may be configured as a unit with the deposition unit of the destacking system.

An aspect of the present disclosure further relates to a tray sealer comprising the destacking system for cardboard blanks according to one of the above described variants. The tray sealer may be provided with a sealing device. The sealing device may include a rigid upper tool part, which maintains its position during the sealing process. The sealing device may further include a movable tray holder comprising troughs provided for accommodating a tray. The tray, including a product, can be guided into the sealing device by means of a conveyor belt. At a predetermined position in the sealing device, the tray can be gripped by the tray holder and displaced upwards by the latter against the upper tool part. The tray can be closed by a cover film guided through the sealing device. The trays may be cardboard blanks. The destacking system of the tray sealer may, for example, be arranged upstream of or beside the tray holder station. The cardboard blanks formed or folded in the destacking system and grouped in a predetermined format according to a distance pattern of the troughs can be placed into a conveying system or feed belt of the tray sealer. The formed or folded cardboard blanks grouped in a predetermined format according to a distance pattern of the troughs can be fixed directly in a conveying system or a feed belt of the tray sealer, with the conveying system feeding the grouped cardboard blanks to the tray holder station. The conveying system of the tray sealer may be configured as a unit with the deposition unit of the destacking system.

An aspect of the present disclosure relates to a method of destacking cardboard blanks, comprising the following method steps: providing a first destacker comprising a first stacking magazine for accommodating a first stack of cardboard blanks, a first retaining system for retaining the cardboard blanks at a first stacking position, and a first conveying unit, providing a second destacker comprising a second stacking magazine for accommodating a second stack of cardboard blanks, a second retaining system for retaining the cardboard blanks at a second stacking position, and a second conveying unit, providing a deposition unit having a first deposition position and a second deposition position, gripping at least a first cardboard blank of the first destacker at the first stacking position by means of a first gripper of the first conveying unit and conveying the first cardboard blank to the first deposition position, gripping at least a second cardboard blank of the second destacker at the second stacking position by means of a second gripper of the second conveying unit and conveying the second cardboard blank to the second deposition position. The method can be executed on the destacking system for cardboard blanks. The destacking system may be suitable for, designed for and/or configured for executing the method.

An angle between a first center axis of the first destacker and a second center axis of the second destacker may have a value of 0° to 45°, particularly more than 0°, preferably 10° to 30°, or may be adjusted in this range.

A minimum distance between a first receiving side of the first stacking magazine and a second receiving side of the second stacking magazine may be larger than a minimum distance between a first deposition area at the first deposition position and a second deposition area at the second deposition position.

The first gripper and/or the second gripper can be moved in a rectilinear or an arcuate path at least between the stacking positions and the deposition positions of the cardboard blanks.

All the features disclosed in connection with the destacking system for cardboard blanks are associated with the method of destacking cardboard blanks. All the features disclosed in connection with the method of destacking cardboard blanks are associated with the destacking system for cardboard blanks.

BRIEF DESCRIPTION OF THE DRAWINGS

An embodiment according to the present disclosure is illustrated by the following Figures, in which.

DETAILED DESCRIPTION

Figure 1:
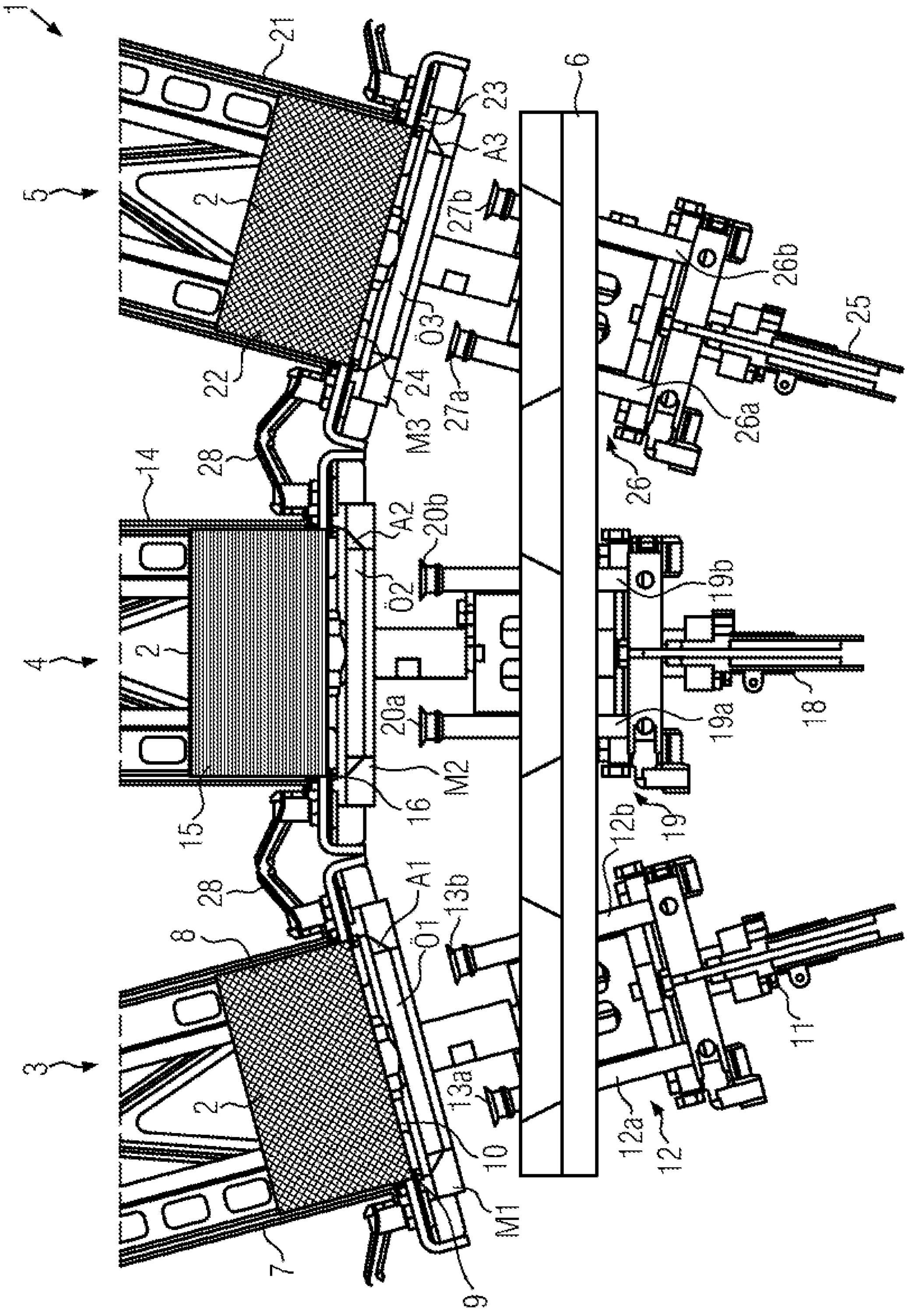
FIG. 1 shows a schematic side view of a destacking system for cardboard blanks according to the present disclosure.

FIG. 1 shows an embodiment of a destacking system 1 for destacking carton blanks 2. The destacking system 1 includes a first destacker 3, a second destacker 4, a third destacker 5, and a deposition unit 6.

The first destacker 3 comprises a first stacking magazine 7 for accommodating a first stack 8 of cardboard blanks 2, a first retaining system 9 for retaining the cardboard blanks 2 at a first stacking position 10, and a first conveying unit 11 with a first gripper 12. The first gripper 12 comprises two gripping units 12*a*, 12*b*. Each gripping unit 12*a*, 12*b* includes a suction head 13*a*, 13*b*. The first destacker 3 has a first die M1 including a first receiving mold A1 for receiving and shaping cardboard blanks 2. The first receiving mold A1 has a first opening Ö1.

The second destacker 4 comprises a second stacking magazine 14 for accommodating a second stack 15 of cardboard blanks 2, a second retaining system 16 for retaining the cardboard blanks 2 at a second stacking position 17, and a second conveying unit 18 with a second gripper 19. The second gripper 19 includes two gripping units 19*a*, 19*b*. Each gripping unit 19*a*, 19*b* includes a suction head 20*a*, 20*b*. The second destacker 4 has a second die M2 including a second receiving mold A2 for receiving and shaping cardboard blanks 2. The second receiving mold A2 has a second opening Ö2.

The third destacker 5 comprises a third stacking magazine 21 for accommodating a third stack 22 of cardboard blanks 2, a third retaining system 23 for retaining the cardboard blanks 2 at a third stacking position 24, and a third conveying unit 25 with a third gripper 26. The third gripper 26 includes two gripping units 26*a*, 26*b*. Each gripping unit 26*a*, 26*b* includes a suction head 27*a*, 27*b*. The third destacker 5 has a third die M3 including a third receiving mold A3 for receiving and shaping cardboard blanks 2. The third receiving mold A3 has a third opening Ö3. The destackers 3, 4, 5 are attached to one another by means of movable articulated arms 28.

Figure 2:
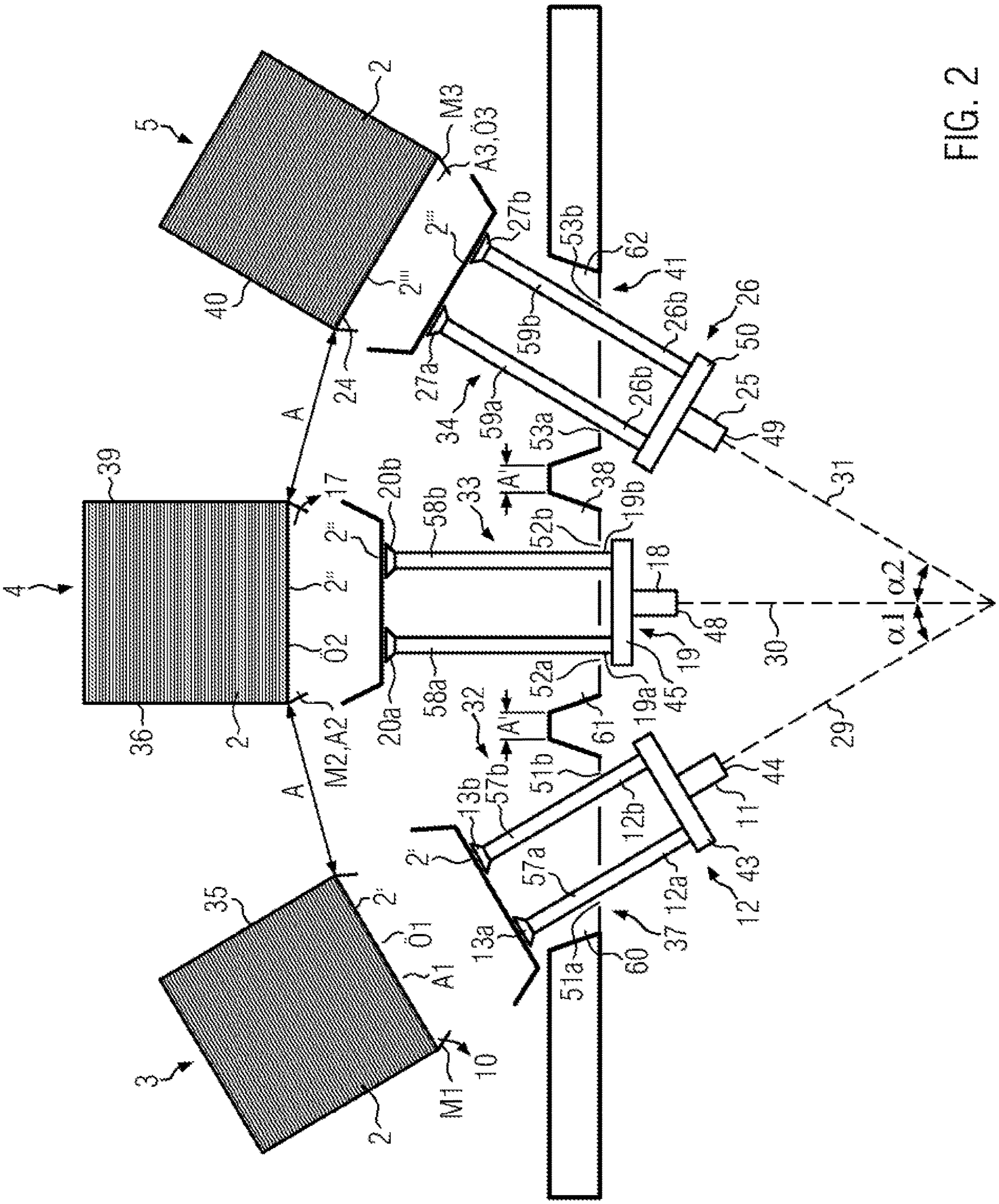
FIG. 2 shows a schematic side view of a destacking system for cardboard blanks according to the present disclosure.

FIG. 2 shows a schematic representation of the destacking system 1. A first angle $\alpha$1 is provided between a first center axis 29 of the first destacker 3 and a second center axis 30 of the second destacker 4. A second angle $\alpha$2 is provided between the second center axis 30 of the second destacker 4 and a third center axis 31 of the third destacker 5. The angles $\alpha$1, $\alpha$2 can be adjusted manually or automatically by means of an electric drive, which is not shown, and a control unit, so as to ensure a desired grouping format of the deposited cardboard blanks 2.

The deposition unit 6 for cardboard blanks 2 may include, for example, a rigid frame, a framework, or a holding structure, and the deposition unit 6 comprises a first deposition position 32, a second deposition position 33, and a third deposition position 34. The first gripper 12 is configured to grip a first cardboard blank 2' of the first destacker 3 at the first stacking position 10 and to convey the first cardboard blank 2' to the first deposition position 32. The second gripper 19 is configured to grip a second cardboard blank 2" of the second destacker 4 at the second stacking position 17 and to convey the second cardboard blank 2" to the second deposition position 33. The third gripper 26 is configured to grip a third cardboard blank 2'" of the third destacker 5 at the third stacking position 24 and to convey the third cardboard blank 2'" to the third deposition position 34. The term "second cardboard blank 2" of the second destacker 4" is intended to refer to the first cardboard blank at the bottom of the second destacker 4, wherein the bottom of the second destacker 4 is at the second opening Ö2. Likewise, the term "third cardboard blank 2'" of the third destacker 5" is intended to refer to the first cardboard blank at the bottom of the third destacker 5, wherein the bottom of the third destacker 5 is at the third opening Ö3.

A minimum distance A between a first receiving side 35 of the first stacking magazine 7 and a first receiving side 36 of the second stacking magazine 14 is larger than a minimum distance A' between a first deposition area 37 at the first deposition position 32 and a second deposition area 38 at the second deposition position 33. Likewise, a minimum distance A between a second receiving side 39 of the second stacking magazine 14 and a first receiving side 40 of the third stacking magazine 21 is larger than a minimum distance A' between the second deposition area 38 at the second deposition position 33 and a third deposition area 41 at the third deposition position 42. The first conveying unit 11 is configured to move the first gripper 12 in a rectilinear path at least between the first stacking position 10 and the first deposition position 32. The second conveying unit 18 is configured to move the second gripper 19 in a rectilinear path at least between the second stacking position 17 and the first deposition position 33. The third conveying unit 25 is configured to move the third gripper 26 in a rectilinear path at least between the third stacking position 24 and the third deposition position 42.

The first conveying unit 11 is provided with a first plate 43 having the gripping units 12*a*, 12*b* arranged thereon. A first lifting device 44 (e.g., electric or pneumatic actuator) drives the axial movement of the first plate 43. The second conveying unit 18 is provided with a second plate 45 having the gripping units 19*a*, 19*b* arranged thereon. A second lifting device 46 (e.g., electric or pneumatic actuator) drives the axial movement of the second plate 47. The third conveying unit 25 is provided with a third plate 48 having the gripping units 27*a*, 27*b* arranged thereon. A third lifting device 49 (e.g., electric or pneumatic actuator) drives the axial movement of the third plate 50.

The deposition unit 6 has a first passage opening 51*a* and a second passage opening 51*b* at the first deposition position 32, a third passage opening 52*a* and a fourth passage opening 52*b* at the second deposition position 33, and a fifth passage opening 53*a* as well as a sixth passage opening 53*b* at the third deposition position 34.

In order to convey the cardboard blanks 2 of the first destacker 3 between the first stacking position 10 and the first deposition position 32, at least a portion 57*a* of the first gripping unit 12*a* of the first gripper 12 is moved through the first passage opening 51*a*, and at least a portion 57*b* of the second gripping unit 12*b* of the first gripper 12 is moved through the second passage opening 51*b*, the lowermost cardboard blank 2' is gripped by the suction heads 13*a*, 13*b* and pulled downwards until the gripped cardboard blank 2' has been placed at the first deposition position 32. Subsequently, the cardboard blank 2' is temporarily fixed at the first deposition position 32 or retained by suction units (not shown) of the deposition unit 6. The suction units may be, for example, suction heads, devices or machines that communicate with a vacuum source (e.g., vacuum pump), and that draw air through passage openings (e.g., passage openings 51*a*, 51*b* or other openings) of the deposition unit 6.

In order to convey the cardboard blanks 2 of the second destacker 4 between the second stacking position 17 and the second deposition position 33, at least a portion 58*a* of the first gripping unit 19*a* of the second gripper 19 is moved through the third passage opening 52*a*, and at least a portion 58*b* of the second gripping unit 19*b* of the second gripper 19 is moved through the fourth passage opening 52*b*, the lowermost cardboard blank 2" is gripped by the suction heads 20*a*, 20*b* and pulled downwards until the gripped cardboard blank 2" has been placed at the second deposition position 33. Subsequently, the cardboard blank 2" is temporarily fixed at the second deposition position 33 or retained by suction units (not shown) of the deposition unit 6. The suction units may be, for example, suction heads, devices or machines that communicate with a vacuum source (e.g., vacuum pump), and that draw air through passage openings (e.g., passage openings 52*a*, 52*b* and/or other openings) of the deposition unit 6.

In order to convey the cardboard blanks 2 of the third destacker 5 between the third stacking position 24 and the third deposition position 42, at least a portion 59*a* of the first gripping unit 26*a* of the third gripper 26 is moved through the fifth passage opening 53*a*, and at least a portion 59*b* of the second gripping unit 26*b* of the third gripper 26 is moved through the sixth passage opening 53*b*, the lowermost cardboard blank 2''' is gripped by the suction heads 27*a*, 27*b* and pulled downwards until the gripped cardboard blank 2''' has been placed at the third deposition position 34. Subsequently, the cardboard blank 2''' is temporarily fixed at the third deposition position 34 or retained by suction units (not shown) of the deposition unit 6. The suction units may be, for example, suction heads, devices or machines that communicate with a vacuum source (e.g., vacuum pump), and that draw air through passage openings (e.g., passage openings 53*a*, 53*b* and/or other openings) of the deposition unit 6.

At the first deposition position 32, a first trough 60 for receiving and shaping cardboard blanks 2 is provided. At the second deposition position 33, a second trough 61 for receiving and shaping cardboard blanks 2 is provided. At the third deposition position 34, a third trough 62 for receiving and shaping cardboard blanks 2 is provided. While being conveyed between the stacking positions 10, 17, 24 and the deposition positions 32, 33, 34, the flat cardboard blanks 2 are formed into a tray shape first by the receiving molds A1, A2, A3 of the respective destackers 3, 4, 5 and subsequently by the respective troughs 60, 61, 62 of the deposition unit 6. The above-mentioned passage openings 51*a*, 51*b*, 52*a*, 52*b*, 53*a*, 53*b* and other openings may be formed at bottom sides of the respective troughs 60, 61, 62.

Figure 3:
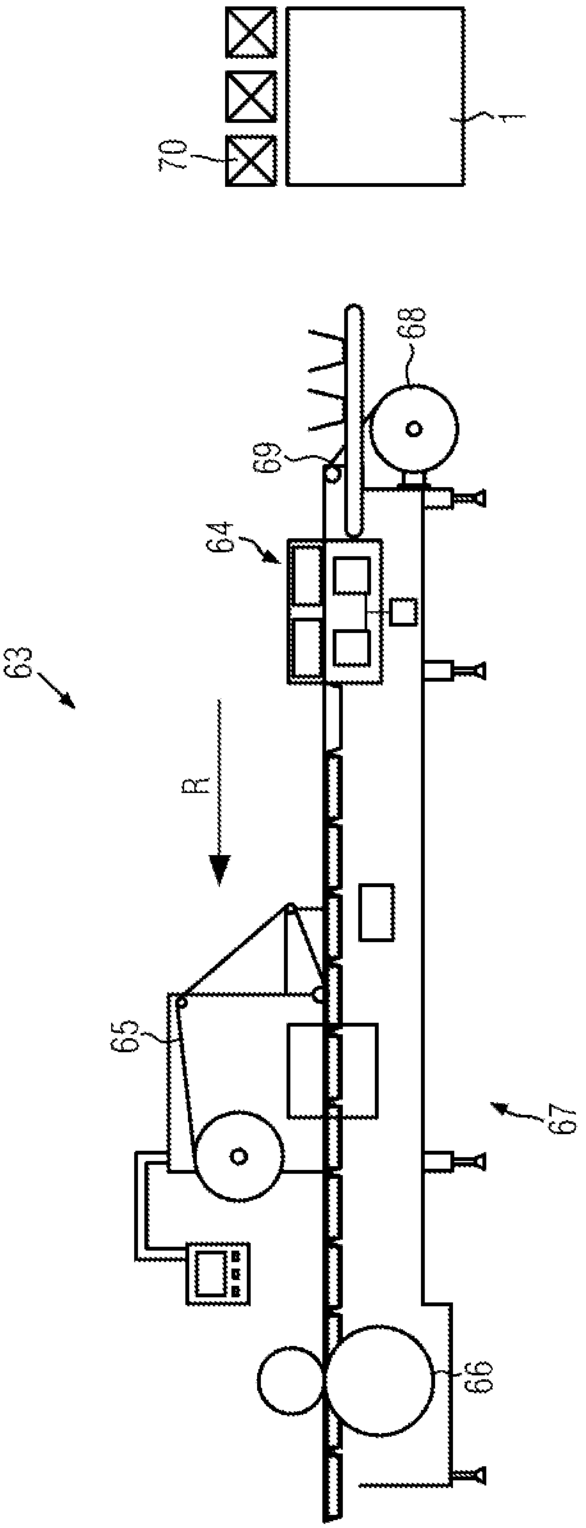
FIG. 3 shows a schematic thermoform packaging machine including the destacking system in a side view.

FIG. 3 shows schematically a thermoform packaging machine 63 comprising the destacking system 1 for cardboard blanks 2 with the above specified features. The thermoform packaging machine 63 comprises a forming station 64, a sealing station 65 and a cutting station 66 arranged in this sequence in an operating direction R on a machine frame 67. On the input side, the machine frame 67 has provided thereon a supply roll 68, from which a first film/foil web 69 is unwound. The cardboard blanks 2 formed and grouped in the destacking system 1 are removed in their grouping format from the deposition unit 6 by means of a manipulator 70 and fed to a feed belt 71 arranged on the thermoform packaging machine 63, and placed into the forming station 64, where the formed cardboard blanks 2 have a film formed thereinto.

Figure 4:
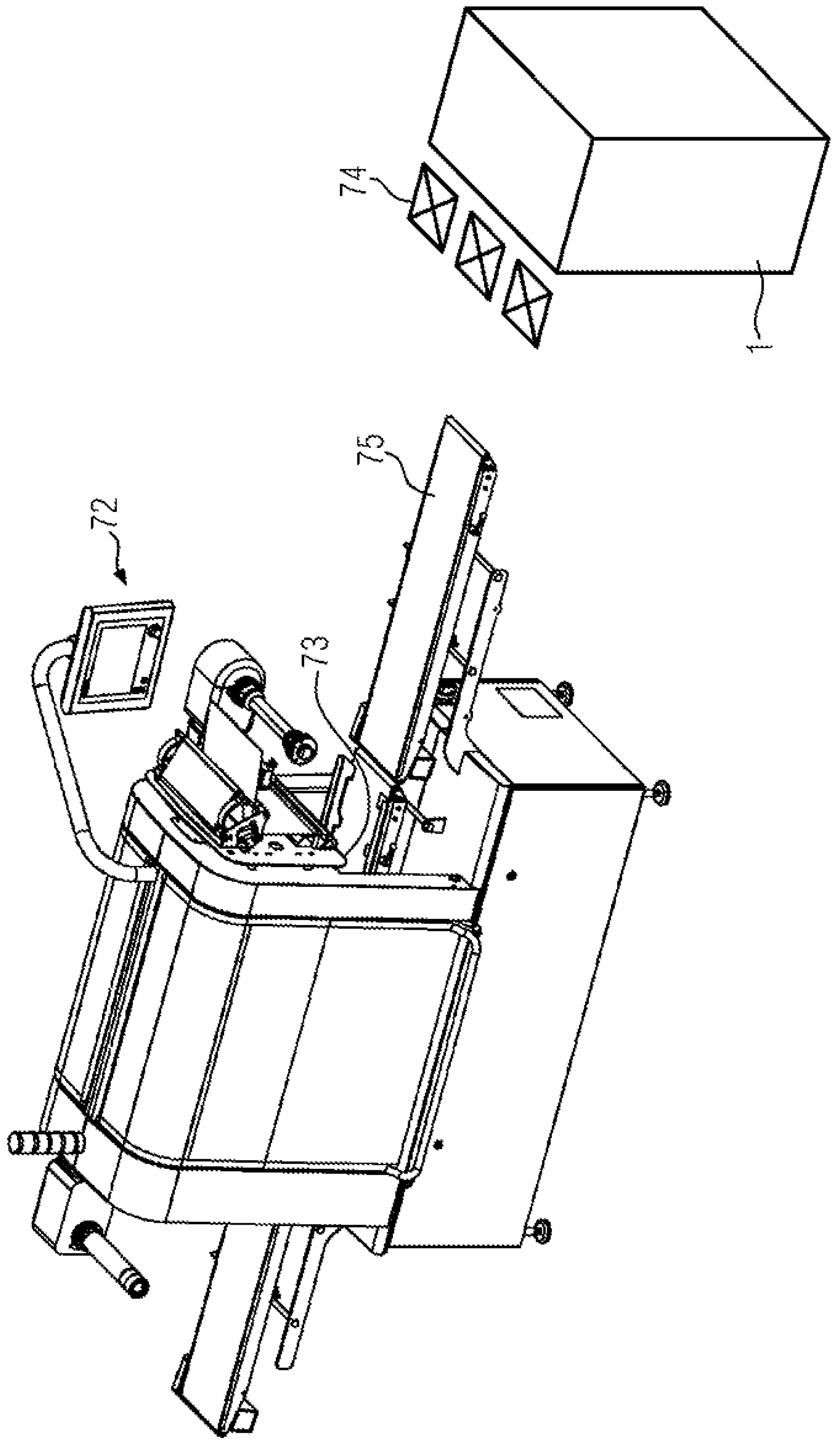
FIG. 4 shows a schematic tray sealer including the destacking system in a perspective view.

FIG. 4 shows schematically a tray sealer 72 comprising the destacking system 1 for cardboard blanks 2. The tray sealer 72 is provided with a sealing station 73 for closing trays with a cover film. The sealing station 73 includes a tool upper part and a tray holder (not shown). The cardboard blanks 2 formed and grouped in the destacking system 1 are removed in their grouping format from the deposition unit 6 by means of a manipulator 74 and fed to a feed belt 75 arranged on the tray sealer 72.

What is claimed is:

1. A destacking system for cardboard blanks, comprising:

a deposition unit for cardboard blanks with a first deposition position and a second deposition position;

a first destacker comprising a first stacking magazine for accommodating a first stack of cardboard blanks, a first retaining system for retaining the cardboard blanks at a first stacking position, and a first conveying unit with a first gripper configured to grip a first cardboard blank of the first destacker at the first stacking position and convey the first cardboard blank to the first deposition position; and a second destacker comprising a second stacking magazine for accommodating a second stack of cardboard blanks, a second retaining system for retaining the cardboard blanks at a second stacking position, and a second conveying unit with a second gripper configured to grip a second cardboard blank of the second destacker at the second stacking position and convey the second cardboard blank to the second deposition position;

wherein a minimum distance between a first receiving side of the first stacking magazine and a first receiving side of the second stacking magazine is larger than a minimum distance between a first deposition area at the first deposition position and a second deposition area at the second deposition position.

2. The destacking system according to claim 1, wherein an angle is provided between a first center axis of the first destacker and a second center axis of the second destacker, the angle having a value of 0° to 45.

3. The destacking system according to claim 2, wherein the angle has a value of 10° to 30°.

4. The destacking system according to claim 1, wherein the first conveying unit is configured to move the first gripper in a rectilinear path at least between the first stacking position and the first deposition position.

5. The destacking system according to claim 1, wherein the first conveying unit is configured to move the first gripper in an arcuate path at least between the first stacking position and the first deposition position.

6. The destacking system according to claim 1, wherein the second conveying unit is configured to move the second gripper in a rectilinear path at least between the second stacking position and the second deposition position.

7. The destacking system according to claim 1, wherein the second conveying unit is configured to move the second gripper in an arcuate path at least between the second stacking position and the second deposition position.

8. The destacking system according to claim 1, wherein the deposition unit has a first passage opening at the first deposition position, the first conveying unit being configured to move at least a portion of the first gripper through the first passage opening, wherein the deposition unit has a third passage opening at the second deposition position, the second conveying unit being configured to move at least a portion of the second gripper through the third passage opening.

9. The destacking system according to claim 1, wherein the deposition unit has, at the first deposition position, a first trough for receiving and shaping cardboard blanks, and, at the second deposition position, a second trough for receiving and shaping cardboard blanks.

10. The destacking system according to claim 9, wherein the first gripper is configured to grip the first cardboard blank of the first destacker at the first stacking position by suction and to pull the first cardboard blank into the first trough, the second gripper being configured to grip the second cardboard blank of the second destacker at the second stacking position by suction and to pull the second cardboard blank into the second trough.

11. The destacking system according to claim 1, wherein the first destacker comprises a first die including a first receiving mold for receiving and shaping cardboard blanks, the first die having a first opening, wherein the first conveying unit is configured to move a portion of the first gripper through the first opening.

12. The destacking system according to claim 1, wherein the second destacker comprises a second die including a second receiving mold for receiving and shaping cardboard blanks, the second die having a second opening, wherein the second conveying unit is configured to move a portion of the second gripper through the second opening.

13. A thermoform packaging machine or a tray sealer comprising the destacking system for cardboard blanks according to claim 1.

14. A method of destacking cardboard blanks, the method comprising:

providing a first destacker comprising a first stacking magazine for accommodating a first stack of cardboard blanks, a first retaining system for retaining the cardboard blanks at a first stacking position, and a first conveying unit;

providing a second destacker comprising a second stacking magazine for accommodating a second stack of cardboard blanks, a second retaining system for retaining the cardboard blanks at a second stacking position, and a second conveying unit;

providing a deposition unit having a first deposition position and a second deposition position;

gripping a first cardboard blank of the first destacker at the first stacking position by a first gripper of the first conveying unit and conveying the first cardboard blank to the first deposition position; and gripping a second cardboard blank of the second destacker at the second stacking position by a second gripper of the second conveying unit and conveying the second cardboard blank to the second deposition position;

wherein a minimum distance between a first receiving side of the first stacking magazine and a first receiving side of the second stacking magazine is larger than a minimum distance between a first deposition area at the first deposition position and a second deposition area at the second deposition position.

15. The method according to claim 14, wherein an angle between a first center axis of the first destacker and a second center axis of the second destacker has a value of 0° to 45°, or is adjusted.

16. The method according to claim 15, wherein the angle has a value of 10° to 30°.

17. The method according to claim 14, wherein an angle between a first center axis of the first destacker and a second center axis of the second destacker is adjustable in a range of 0° to 45°.

18. The method according to claim 14, wherein the first gripper is moved in a rectilinear path or an arcuate path at least between the first stacking position and the first deposition position and/or the second gripper is moved in a rectilinear path or an arcuate path at least between the second stacking position and the second deposition position.

19. A destacking system for cardboard blanks, comprising:

a deposition unit for cardboard blanks with a first deposition position and a second deposition position;

a first destacker comprising a first stacking magazine for accommodating a first stack of cardboard blanks, a first retaining system for retaining the cardboard blanks at a first stacking position, and a first conveying unit with a first gripper configured to grip a first cardboard blank of the first destacker at the first stacking position and convey the first cardboard blank to the first deposition position; and a second destacker comprising a second stacking magazine for accommodating a second stack of cardboard blanks, a second retaining system for retaining the cardboard blanks at a second stacking position, and a second conveying unit with a second gripper configured to grip a second cardboard blank of the second destacker at the second stacking position and convey the second cardboard blank to the second deposition position;

wherein an angle is provided between a first center axis of the first destacker and a second center axis of the second destacker, the angle having a value of 10° to 30°.

20. A thermoform packaging machine or a tray sealer comprising the destacking system for cardboard blanks according to claim 19.

* * * * *